United States Patent [19]
Ullmann et al.

[11] 3,830,996
[45] Aug. 20, 1974

[54] SUPERIMPOSED MOTION ELECTRO-EROSION ELECTRODE DRIVE

[75] Inventors: Werner Ullmann, Locarno-Muralto; Arno Sieg; Silvano Mattei, both of Locarno; Bernd Schumacher, Losone, all of Switzerland

[73] Assignee: A.G. fur industrielle Elektronik AGIE Losone b. Locarno, Losone, Switzerland

[22] Filed: Feb. 4, 1972

[21] Appl. No.: 223,420

[30] Foreign Application Priority Data
Aug. 26, 1971 Switzerland.................. 12622/71

[52] U.S. Cl.............................................. 219/69 V
[51] Int. Cl............................................... B23k 9/16
[58] Field of Search................................ 219/69 V

[56] References Cited
UNITED STATES PATENTS
2,974,216    3/1961    Inoue ............................. 219/69 V
3,671,705    6/1972    Raznitsyn ....................... 219/69 V FOREIGN PATENTS OR APPLICATIONS
972,889    10/1959    Germany ....................... 219/69 V Primary Examiner—J. V. Truhe
Assistant Examiner—Hugh D. Jaeger
Attorney, Agent, or Firm—William R. Woodward; Flynn & Frishauf

[57]    ABSTRACT

A wire electrode of an electro-erosive cutting machine is guided along a cutting path in a feed motion. In order to remove material from the work piece, for example to make a V-shaped notch for later welding, the electrode has a cyclical motion, for example circular or elliptical, imparted thereto superimposed upon the feed motion over the cutting path, the cyclical motion being obtained for example by a mechanical linkage drive, by electrical signal-motion transducers and the like, preferably at a rate which is high with respect to the feed motion.

20 Claims, 17 Drawing Figures

SUPERIMPOSED MOTION ELECTRO-EROSION ELECTRODE DRIVE

U.S. Ser. No. 150,511, Filed 7 June 1971; and U.S. Ser. No. 158,721, Filed 1 July 1971.

The present invention relates to an electro-erosive apparatus, and particularly to a contour machining apparatus in which a pair of work pieces are cut by means of a cutting wire-type electrode guided along a contoured cutting path in a feed motion, the electrode being stretched between a pair of guides or holders.

U.S. applications Ser. No. 150,511, filed June 7, 1971, and Ser. 158,721, filed July 1, 1971, assigned to the assignee of the present application disclose a method and apparatus for applications 29776/71 and 31473/71, or Swiss Pats. Nos. 513,694 and 513,693) disclose a method and apparatus for cutting work pieces by means of a wire electrode, moved along a cutting path, to effect electro-erosive cutting. This method and system of separating and profiling work pieces exists together with electro-chemical processing, including etching and engraving, as well as arcing or sputtering, and electro-chemical grinding, which is preferably used to provide profiled ground surfaces. The various known processes utilize the material removing effect of an electrical discharge between a pair of electrodes which are located with a predetermined distance on the sides of a dielectric work piece. The electrode distance, which may be termed the working gap, is maintained at a certain dimension by a control arrangement, which moves the operating electrode in accordance with a feed movement. In the system and methods to make depressions, and to grind, as well as in the straight cutting by means of wire electrodes, a single-axis servo controller is provided which permits almost any desired geometrical configuration to be made, and extending perpendicular to the feed movement. If, however, spark erosive cutting is used for two-dimensional problems by providing a path-controlled wire electrode, then a control is required which has a motion control extending over more than one axis. Multi-axis copy controllers, or numerical positioning and path control may be used. It is difficult, however, particularly in multi-dimensional contouring control, to make a conical profiled cut, since the wire will have to be located in an inclined position, which requires the guides for the cutting wire to not only be controlled with respect to the commanded feed direction, but additionally to provide the requisite instantaneous inclination, resulting from the respective instantaneous vector of movement. Contour copying by means of a wire electrode has been proposed in which the wire electrode is given a variable inclination by means of a ring contact, from which a stepwise varying signal is taken off which controls a mechanical adjustment for the wire electrode. The relative movement of the wire guide path, or wire guide heads with respect to each other, which is necessary for the respective inclination of the wire electrode can be obtained also in numerically controlled contour path arrangements. This is more closely described in the application U.S. Ser. No. 150,511 above referred to. The inclination of such a numerically controlled wire, that is, controlling the position of a copying head numerically, requires a fair amount of apparatus and equipment.

It is an object of the present invention to permit moving an electro-erosive wire over a cutting path and at the same time superimpose on the cutting path a movement which has the effect of inclination of the cutting wire, which requires only simple equipment and apparatus and does not introduce additional complexity into the apparatus commanding the feed path of the wire.

The term "electro-erosive" cutting has been selected for the machining method in which a wire is used to electrically affect the work piece, as more fully disclosed in the aforementioned cross referenced applications.

SUBJECT MATTER OF THE PRESENT INVENTION

Briefly, an elliptical, circular, or otherwise cyclically repetitive motion is superimposed on the feed motion of the electroerosive wire, determined, for example, by numerical or otherwise contour controlled commands. The cyclical superimposed motion will then cause the wire to describe a conical movement, in which the cone travels in accordance with a commanded contour, the angle of inclination $\alpha$ of the cone being located in a plane which is perpendicular to the plane of the major axis of the cone, and substantially or essentially perpendicular to the axis of the wire carrying out this motion.

The invention will be described by way of example with reference to the accompanying drawings, wherein:

FIG. 12a is a fragmentary top view of the drive of FIG. 12;

Figure 1:
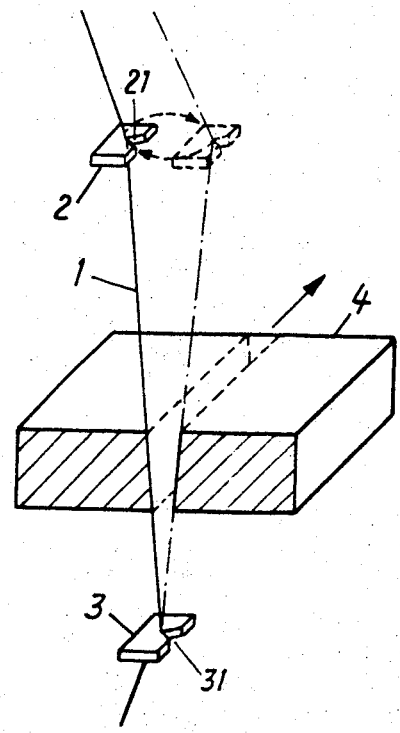
FIG. 1 is a schematic illustration of the basic principle of the present invention.

The drawings of the present application only show the basic principle of the invention, the feed mechanisms to provide complete contouring, and the electro-erosive apparatus being completely described and shown in detail in the cross referenced applications Ser. No. 150,511 and Ser. No. 158,721. Wire electrode 1, which may be a wire of 1/100 to 1 mm diameter is stretched between a pair of holders or guides 2, 3. Under "wire" in the context of the present application, a filamentary conductor is to be understood having a cross-sectional aspect which may be circular, elliptical, or polygonal. The wire guides 2, 3 have notches formed therein which match the cross section of the wire. The wire, during carrying out the process, is supplied from a lower supply roller (not shown) over the lower guide 3, through the work piece 4, to the upper guide 2 and is then spooled on a take-up spool, not shown. The wire electrode is guided in notches 21, 31 formed in the guides 2, 3. In actual practice, the notches are so formed that the wire electrode is stretched, and guided, but is not damaged or deformed. Notches 21, 31, as shown in FIG. 1, are merely schematic illustrations; cross referenced applications illustrate further detail.

Figure 2:
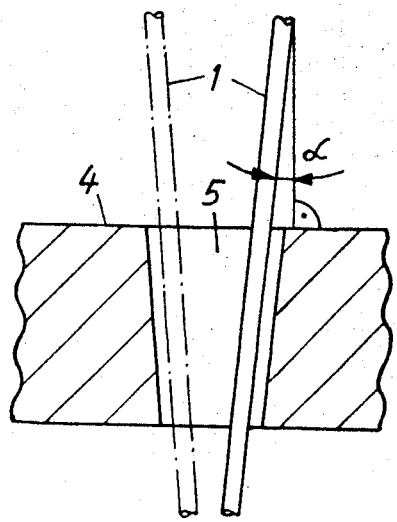
FIGS. 2 and 3 are longitudinal sections through work pieces, illustrating the method, FIG. 2 illustrating a conical and FIG. 3 a double-conical wire movement.

In accordance with the present invention, the upper and lower, or the upper or the lower guide 2, 3, is additionally subjected to a rotating movement, as indicated by the broken-line arrows in a plane which is transverse to the feed movement, indicated by a solid arrow. Let it be assumed that the lower guide 3 is held stationary (with respect to the additional rotating movement — actually it moves in feed direction along the solid arrow), and the upper guide 2 is subjected to a cyclical movement which, in this case is rotary, then the wire 1 will describe the circumference of a cone, resulting in an inclined, conical cut having an angle of inclination $\alpha$ (FIG. 2). The angle $\alpha$, even in two-dimensional cutting will remain constant with any random profile at any random tangent.

The rotary movement is superimposed to the upper guide 2; the furthest excursion of the wire is indicated by a chain dotted line. The lower guide 3 is not subjected to this cyclical movement. In addition to the cyclical movement indicated in connection with guide 2, both guides 2, 3 are moved in transport path in the direction of the solid arrow, the resulting cut being indicated by the dashed lines in work piece 4. The rotating, conical movement of wire 1 is carried out at a speed which is high with respect to the speed of feed movement in the direction of the solid arrow. Of course, the conical cut can be carried out by moving the lower guide 3 and holding the upper guide 2 stationary with respect to rotating movement that is, subjecting it only to the feed movement along the solid arrow. It is equally possible to move both guides 2, 3 conjointly, in a rotating movement. If the cut is to be made in X-shape (FIG. 3), the phasing of movement of the two guides can be so adjusted that when the wire is deflected from a central position in one direction at the top, it is moved in the opposite direction at the bottom. The work piece need not be a single solid element but may be a stack of various plate-like or otherwise shaped members. Movement of the two guides 2, 3 superimposed upon their feed need not be the same, or with the same radius. The deflection radius of the movement can be different, and the relative phasing or synchronization can be different, so that the eventual movement, determining the eventual shape of the cut, will be cylindrical, or conical, so that various kinds of profiles can be made. The cylindrical profile is a limiting case of the conical profile. By suitable choice, or selection of the radius of movement, the width of the cut can be changed independently of the working gap. If the apparatus is made to be adjustable independently of its feed movement, the width of the cut can be changed during actual cutting operation.

The enlarged view of FIG. 2 illustrates a cut which will result from the arrangement of guidance of FIG. 1. The cut will be inclined, at an angle $\alpha$, the angle itself being adjustable by changing the excursion movement of the wire guide. The angle of inclination can be varied from a limiting case of a straight electrode to a small angle from as little as 1° to 15°, or more; under ordinary conditions, 15° is the usual maximum which is required. Since the feed movement is much slower than the cyclical, rotating movement of the electrode, the cut in work piece 4 will be completely straight and will not show any wavy surfaces, as one might expect when the rotary superimposed movement on the feed movement is considered alone and independently therefrom. The working gap 5 between the work piece and the electrode is provided in order to permit a flushing medium to be introduced therein.

Figure 3:
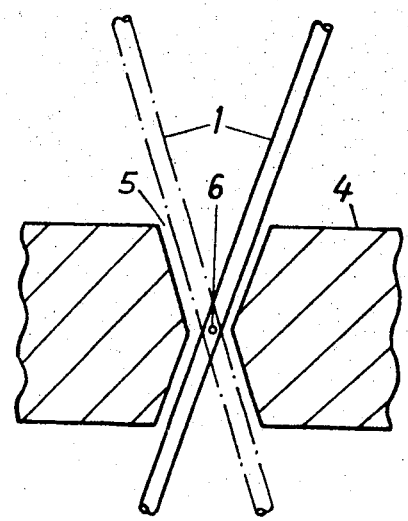

An X-shaped cut is shown in FIG. 3, defined by guiding both wire guides 2 and 3 in rotary movement. The upper wire electrode is offset with respect to the lower by 180°. The double-conical excursion of the wire will result in the double-inclined X-shaped configuration. The amplitude of rotary motion of the two guides 2, 3 can be varied to select the angle $\alpha$ in the same manner as in FIG. 2, from less than 1° to an angle in the order of 15°. The movement of wire electrode 1, as illustrated in FIG. 3, is so arranged that the central node 6 is exactly in the center of the work piece 4. By suitably selecting the relative movement of the guide elements 2, 3, it is possible to change the position of the central node to fall at any point within the thickness of the work piece 4. This will result in double-inclined cuts which may be necessary for specific applications. It is possible, for example, to precut a V-shaped groove for welding processes at the root of the cut. Two work pieces 4 can thus be eroded simultaneously. In this case, desirably the central node 6 is so placed that it will be aligned with that position of the two work pieces at which they should touch; the node can also be offset with respect to this position. By moving the nodal point, one work piece can be formed to obtain a double-inclined profile, whereas the other will have only a single inclination.

The rotary motion illustrated in connection with FIGS. 1–3 may be circular, as well as elliptical. The superimposed cyclical movement, added to the average feed movement (solid arrow) will eventually result in a condition of equilibrium as cutting proceeds; this equilibrium condition provides for constant width of the working gap during the entire cutting procedure.

Figure 4:
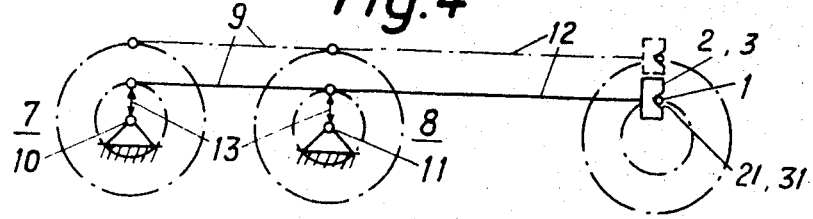
FIGS. 4, 5 and 6 are schematic representations illustrating systems to obtain movement of the wire.
Figure 12:
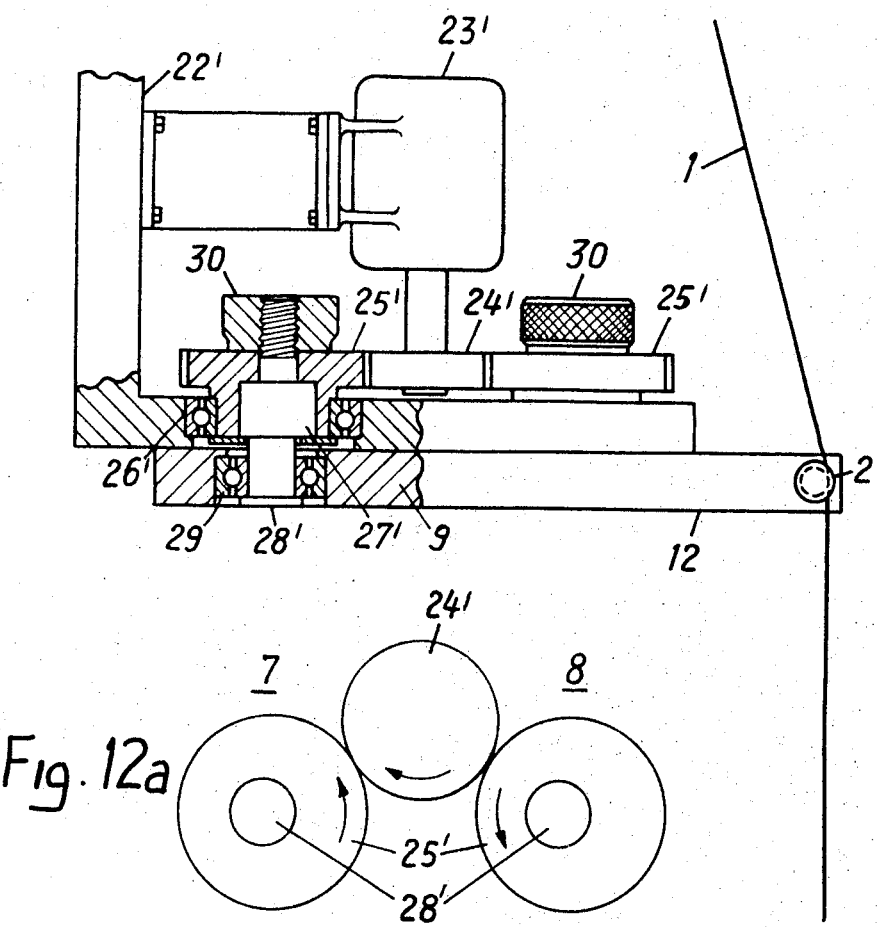
FIG. 12 is a side view, partly in section, and illustrating an apparatus to obtain the wire movement illustrated schematically in FIG. 4.

Additional deflection is easily and simply obtained by various types of deflection systems. FIG. 4 illustrates, in schematic representation, a parallel link drive, in which a drive 7 and a drive 8 both connect with a link having link arms 9, 12. The drives 7, 8 are interconnected, for example by gears, chain belts, or the like, to provide synchronized interconnection, or by means of friction wheels, belts, or similar interconnection, synchronization being maintained by the link arm 9. A gear drive interconnecting the arms 9 is illustrated in FIG. 12 and will be referred to below. The synchronized, as well as power drive interconnection is formed, in FIG. 4, by link arm 9. The two drives 7, 8 rotate over fixed centers 10, 11, and generate a circular movement which is connected over link arm 12 of the link 9–12 over either of the guides 2, 3 (or both), to effect the desired cut as discussed in connection with FIGS. 1–3. The length of the eccentric deviation of the attachment point of links 9, 12 to the rotating arm 13 is adjustable. By changing the length of the eccentric distance 13, the angle $\alpha$ of the inclination of the cut can be adjusted, the limits of the changes of length of the excursion being indicated by the chain-dotted lines of the link, and the circles of excursion in FIG. 4.

Figure 5:
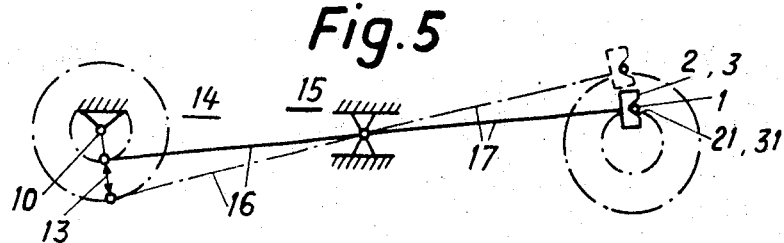
Figure 13:
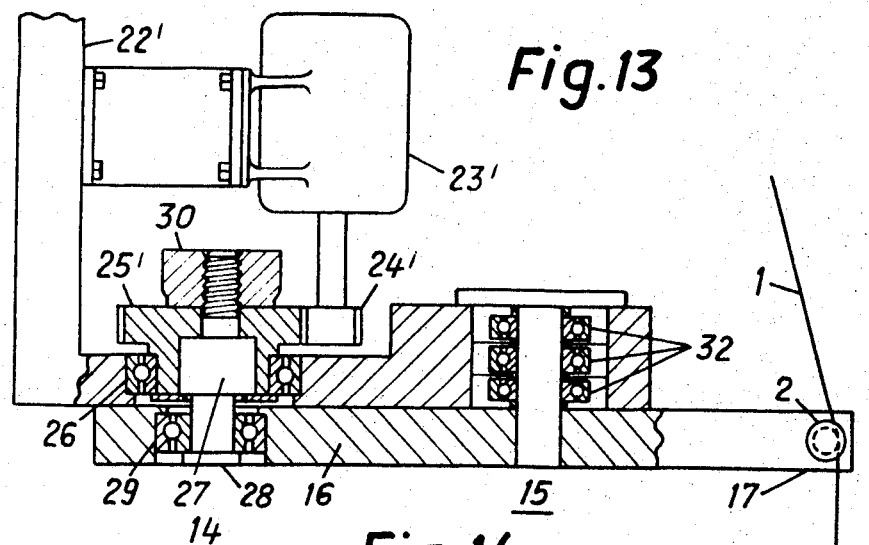
FIG. 13 is a side view, partly in section, of an apparatus to obtain the drive schematically illustrated in FIGS. 5 and 6.

A single crank drive 14 combined with a sliding joint 15 is illustrated in FIG. 5. Sliding joint 15 is located between the crank 14 and the controlled wire guide, 2, 3, (or both). Link arm 16 interconnects crank drive 14 with a sliding joint 15. Link arm 17 then completes the link and connects with the wire guide. The relative lengths of the link arms 16, 17 can be suitably selected, for example 1 : 1. Changing the crank arm of crank arrangement 14 between the chain-dotted circles changes the angle of inclination $\alpha$ of the wire electrode, located between the notches 21, 31 of the guide elements 2, 3. The change of excursion is again indicated by a chain-dotted line. Normally, the angle of inclination is adjusted before the electro-erosive machining starts, but it is possible to change this angle also during operation. The single crank drive 14 combined with a sliding joint 15 centrally of the link is so adjusted that either the upper, or the lower, or both wire guides 2, 3 may carry out a circular or elliptic cyclical movement. The determination whether the movement is to be circular or elliptical is determined by adjusting the relative length of the link arms 16, 17 of the interconnecting link. An example of such a drive is shown in FIG. 13, to which reference will later be made.

Figure 6:
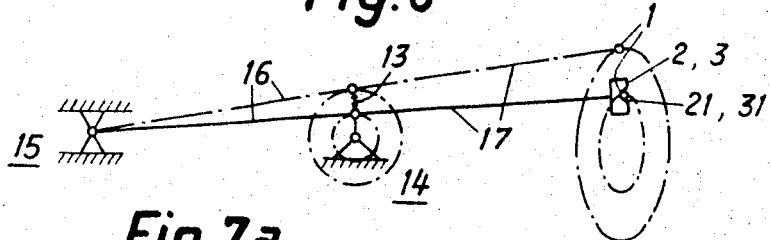

FIG. 6 illustrates a single crank drive 14 and a sliding joint 15, in which the sliding joint is located at the far end of the crank drive, the crank drive 14 being located intermediate the link arms 16, 17. The crank drive 14 has a range of adjustment by changing link 13, in order to adjust the angle of inclination $\alpha$, as indicated in chain-dotted lines in FIG. 6. The crank drive is driven from a power source, similarly as in FIG. 5, by means of gears, belts or the like, in synchronism with a drive, or free, from a motor. The upper and/or the lower wire guide 2, 3 may be subjected to elliptical, cyclical movement, circular movement being one limiting case of elliptical movement. The ratio of the two link arms 16, 17, if 1 : 1, results in an elliptical excursion. Shortening link arm 17 with respect to link arm 16 changes the elliptical movement of wire electrode 1 to approach circular movement, the circular one being obtainable theoretically upon the link arm 17 having zero length.

Figure 7A:
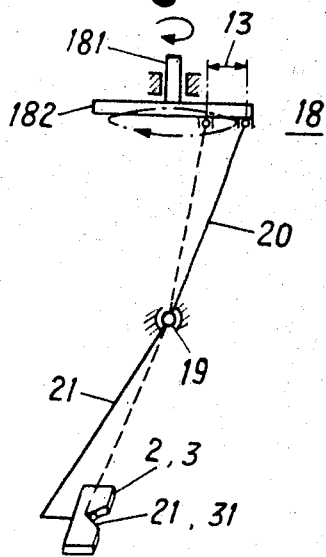
FIGS. 7a and 7b illustrate the principles of a swinging joint to obtain superimposed wire movement.
Figure 7B:
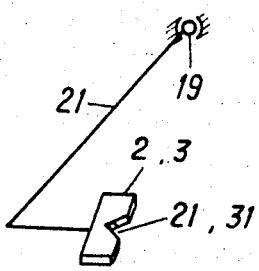

FIG. 7 illustrates a crank drive 18 with a vertically arranged swinging joint 19. Crank drive 18 is driven from a shaft 181, fixed in the feed apparatus of the electro-erosive cutting apparatus. Plate 182, secured to pin 181, has a lever 20 secured thereto, which is linked at a swinging joint 19. The interconnection between the swing joint 19 and one of the wire guides 2, 3, is by means of a second link arm 21. The crank drive 18 again is driven directly, synchronized with a drive for example by gears or chain belts, or merely power operated by a non-synchronous drive such as a belt or friction wheel. Link arm 20 is secured to plate 182 in such a manner that its eccentricity on plate 182 is adjustable within a predetermined range so that the effective crank arm 13 can be changed, thus changing the angle of inclination $\alpha$ of the wire electrode. The embodiment illustrated will result in a circular movement of the electrode. The swing joint 19 can be located, as illustrated in FIG. 7b, in such a manner that the wire electrode is substantially deflected, by offsetting the alignment of the link arms 20, 21.

The crank drives of FIGS. 4–7 are powered by a controlled electric motor, which can be located on the feed carriage of the apparatus.

Figure 8:
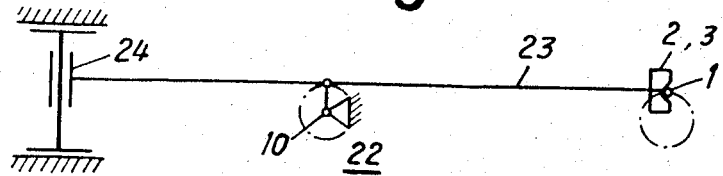
FIGS. 8, 9 and 10 are schematic representations of different embodiments of obtaining wire movement and utilizing a parallel guidance.
Figure 9:
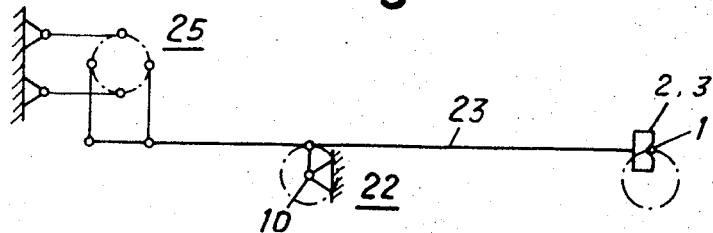
Figure 10:
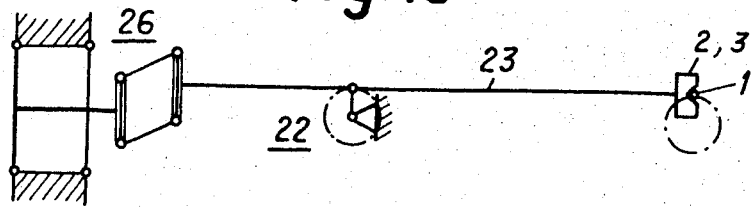

FIGS. 8, 9 and 10 illustrate crank and linkage arrangements in which the cranks provide a parallel connection. The crank drive 22 of FIG. 8 is driven from a motor, not shown, and moves the link 23 in a circular orbit, to which one of the guides 2, 3 is attached. The other end of link 23 is connected over a joint 24 with a fixed point on the feed carriage or feed mechanism of the electro-erosive apparatus. The parallel joint 24 may be a universal, or cardan joint (FIG. 8), a double parallel link 25 (FIG. 9) or a link spring arrangement 26 (FIG. 10). The angle of inclination $\alpha$ can be adjusted by adjusting the length of the arm interconnecting the pivot point 10 with the link 23. Again, either the upper, or the lower wire guide, or both, can be moved to describe a circle of the same, or different diameters.

Figure 11:
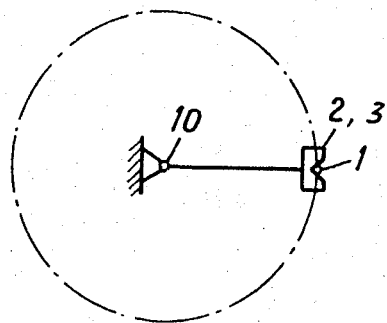
FIG. 11 is a schematic illustration of the principle of a rotating wire guide drive.

FIG. 11 illustrates a rotating wire guide, rotating about a fixed center 10. The distance between the center 10 and the wire guide 2, 3 determines the angle of inclination $\alpha$ of the wire electrode. This arrangement is described in more detail in FIG. 14.

FIGS. 12 and 12a illustrate a construction to carry out the system of FIG. 4, in which the wire electrode 1 is subjected to a circular, cyclical movement. A fixed member 22', secured or forming part of the apparatus feed, has drives 7, 8 (FIG. 12a) arranged thereon, driven over a motor 23' over gear 24'. Gear 24' engages gears 25' of the two drives 7, 8, as clearly seen in FIG. 12a. Gears 25' are held in frame 22' in ball bearings 26', and are formed in their lower part with an eccentric 27', which is adjustable by means of screws 30. The eccentric 27' is connected with a pin 28' which is journalled in the link formed of arms 9, 12. Drive 8 has a similar eccentric pin engaging the link arm 12 of the link. The link formed of arms 9, 12 retains upper wire guide 2, guiding wire 1. The adjustment screws 30 are provided to move the eccenter 27' and pin 28' from the center of gears 25', both drives 7, 8 being adjustable, in order to change the region 13 (FIG. 4), and thereby change the angle of inclination $\alpha$ (FIGS. 1, 2, 3). FIG. 12a illustrates in detail shifting of the eccentricity. In operation, motor 23 oscillates the upper wire guide 2 to describe a circle, so that the wire electrode 1 will act as a generatrix of a cone, cutting a pair of inclined surfaces from work piece 4, while being fed longitudinally in the commanded contour along the work piece (as described in detail in the cross referenced applications). Frame 22 itself is moved by a feed motor in the feed path. The eccentricity of the two drives 7, 8 must be met together, since the eccenter pins 28 are interconnected by the link arms 9, 12, of the link with each other. The matching, conjoint adjustment of the two screws 30 is obtained by a mechanical interconnection (not shown). The drive from motor 23' over gear 24' and gears 25' provides for synchronous movement of the guide 2 with the rotation of the motor 23'; if this is not necessary, or if other arrangements are more convenient from a design point of view, the drive may be by means of belts, friction wheels or the like.

A similar drive arrangement can be associated with the lower wire guide 3, likewise providing for rotary cyclical, circular movement of the wire guide. The movement can be synchronized by synchronizing motors 23, to obtain deflection of the wire, as desired, and discussed in connection with FIGS. 2 and 3.

FIG. 13 illustrates a construction of the principle of the crank drive of FIGS. 5 and 6, having a sliding joint.

Arm 22', and secured to the feed mechanism, holds motor 23', which interconnects the sliding joint 15 with the link arms 16, 17 of the link connected to the upper wire guide 2. The motor 23' drives gear 24' which meshes with gear 25' of the crank drive 14, which is journalled in arm 22 by means of ball bearing 26'. Adjustment screw 30 changes the eccentricity of eccentric 27 located in gear 25', and acting on eccentric pin 28, which is journalled in the link 16, 17 in a ball bearing 29. The slide joint or bearing 15 is movable in the lower portion of the bracket or arm 22' and is rotatably retained by a series of three superimposed ball bearings 32'. In operation, motor 23' provides a rotary movement to the wire guide 2 depending on the extent of eccentricity set in the crank drive 14, as illustrated and discussed in connection with FIG. 5. The extent of eccentricity is set by a screw 30, to vary the length of the crank arm within the adjustment region 13. When the ratio of the two link arms 16, 17 is 1 : 1, the wire guide 2 will carry out a circular movement. Elliptical movement is obtained by suitably changing the ratio of the length of the link arms 16, 17 with respect to each other.

The system schematically shown in FIG. 6 can readily be instrumented similar to the construction shown in connection with FIG. 13. It is only necessary to interchange the sliding bearing 15 and the crank drive 14, as illustrated in FIG. 13, that is, to move the sliding bearing 15 to the left and to place the rotary bearing 14, instead, at the right of pinion 24' driven by motor 23'. The adjustment of eccentricity, and thus of the angle of inclination $\alpha$ can be done in the same manner as described. FIG. 13 illustrates superposition of the rotary motion to the upper wire guide 2; similarly, the lower wire guide could also be subjected to a superposed rotary motion, which may be circular, or elliptical, as desired, synchronized or not with respect to that of the upper drive.

Figure 14:
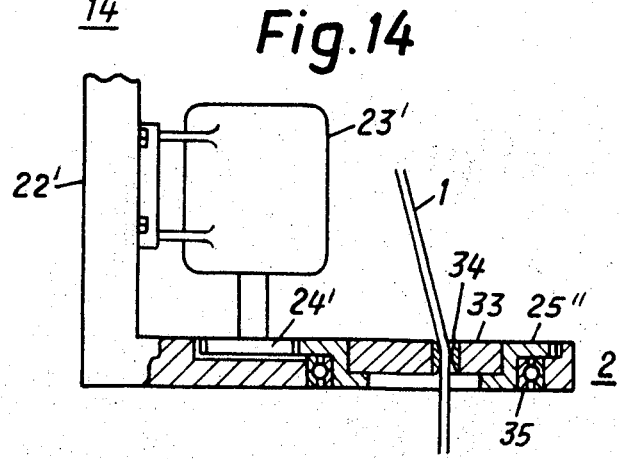
FIG. 14 is a partly schematic, fragmentary side view, partly in section, of the rotating drive schematically illustrated in FIG. 11.

The apparatus schematically shown in FIG. 11 is again illustrated in FIG. 14, to show an actual operative example. Arm 22' of the feed carriage holds electric motor 23' which drives pinion or gear 24'. Gear 24' is in mesh with a gear 25'', in which an eccenter 33 is located. The eccenter 33 is replaceable within gear 25''. Eccenter 33 is formed with a guide or holder 34 for the wire electrode 1. Holder 34 is so shaped that, upon rotation of gear 25'' and with it of eccenter 33, no rotary force is applied to the wire 1, in order to avoid twisting of the wire electrode. The holders, or guides described in connection with all the examples are so made, in order to prevent twisting forces being applied to the electrode wire 1. The angle of inclination $\alpha$ is determined by the eccentricity of the movement of the wire electrode 1. This eccentricity, in FIG. 14, is changed by replacing the eccentric 33 within gear 25'' by a different eccenter. The gear 25'' is secured by means of ball bearings 35 in a bracket on arm 22'. A similar arrangement can be used for the lower wire guide 3, and drive of the gear 25'' may be synchronized between the upper and lower motors 23'.

Figure 15:
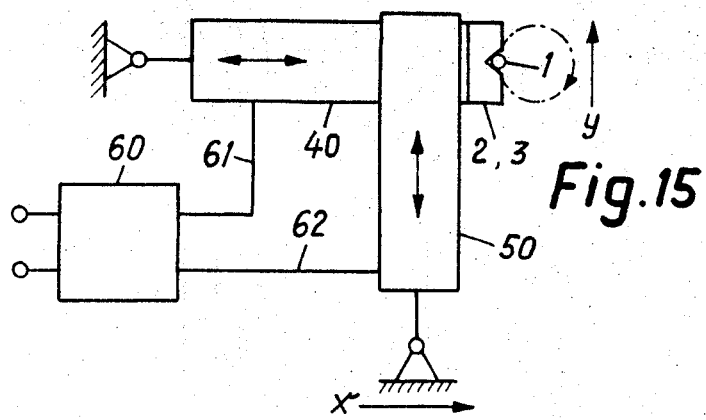
FIG. 15 is a schematic showing of an apparatus obtaining wire deflection by electrical transducers.

Cyclical motion of the wire guides 2, 3 can be obtained not only by means of a motor, but also by shifting the guides by electrical-motion transducers. FIG. 15 illustrates an arrangement in which such transducers are used; they may be magnetostrictive, or piezostrictive transducers, driven from an oscillator 60. A pair of magnetostrictive, or piezostrictive transducers 40, 50 are provided for each one of the wire guides 2, 3. The upper, or the lower, or both the upper and the lower wire guides can be moved by transducers 40, 50. A pair of transducers are necessary for each one wire guide, the transducers being located with respect to each other at an angle of 90°. The oscillator 60 provides electrical pulses for the transducer 40, which moves the wire guide 2, 3 in the $x$-coordinate; similarly, oscillating signals are applied to the transducer 50 which moves the wire guide in the $y$-coordinate. Applying sinusoidal voltages to the two transducers, in selected phase, causes the guides 2, 3 and with it the wire electrode 1 to carry out cyclical movements. If the outputs 61, 62 of oscillator 60 are 90° out of phase, then the movement will be circular, as indicated in the chain-dotted line in FIG. 15. By varying the phasing of the outputs of the oscillators, Lissajou figures can be generated, as desired, by the wire guide 2, 3 and with it the wire. The adjustment of the angle of inclination $\alpha$ is set by varying the amplitudes of the electric output signals on the line 61, 62. The two transducers 40, 50 for one wire guide are preferably identical, and of the same type. The output of the oscillator 60 which functions as a power source can be matched to the type of apparatus used.

Various changes and modifications may be made within the inventive concept and other motion generating equipment, superimposing cyclically varying motion on one, or the other of the wire guides above the feed of the electro-erosive wire can be provided.

We claim:
1. Electro-erosive cutting machine comprising:
a wire electrode (1), a pair of support means (2,3) stretching the wire therebetween, the wire being guided by said support means along a cutting path in a feed motion, and means for continually renewing the wire electrode;
cycling means controlling at least one of said support means for causing the wire to carry out a cyclical motion additional to and superimposed upon the feed motion along the cutting path, said superimposed cyclical motion being effected in a plane substantially transverse to the axis of the wire, the excursion of the wire due to the superimposed cyclical motion including an angle of inclination $\alpha$ with respect to a direction perpendicular to said plane to provide an inclined cut to a work piece, said cycling means comprising a motor driven crank drive and rod linkage means for mechanically transmitting cyclical motion from said crank drive to at least one of said support means.

2. Machine according to claim 1, wherein (FIG. 4) the means controlling the wire to carry out the cyclical motion comprises (FIG. 4) a parallel crank drive (7, 8) connected to at least one of the support means (2, 3), the length (13) of the cranks of the parallel drive from the center of rotation of the cranks determining said angle $\alpha$.

3. Machine according to claim 2, comprising (FIG. 12) a motor (23') to drive said crank, the crank drive (7, 8) comprising an eccentric (27') and eccentric pin (28) having adjustable eccentricity in the eccentric; and means to drive the eccentric from the motor.

4. Machine according to claim 1, wherein (FIGS. 7a, 7b) the means controlling the wire to carry out its cyclical motion comprises a crank drive (18);
   a lever (20, 21), and a joint intermediate the lever, the position of the lever on the crank drive being adjustable to vary the eccentricity of the lever.

5. Machine according to claim 1, wherein (FIGS. 8-10) the means controlling the wire to carry out its cyclical motion comprises
   lever means (23) attached to at least one of the support means;
   a crank drive (22) connected to the lever and cyclically moving the lever;
   and the means supporting the lever comprises a parallel joint (24, 25, 26) connected to be moved along the cutting path in the feed motion of the machine.

6. Machine according to claim 5, wherein the parallel joint is a cardan joint (FIG. 8: 24).

7. Machine according to claim 5, wherein the parallel joint is a double link joint (FIG. 9: 25).

8. Machine according to claim 5, wherein the parallel joint is a parallelogram spring connection (FIG. 10: 26).

9. Machine according to claim 1, wherein a motor (23) and a rotary cyclically moving drive (25') are provided;
   an eccentric (33) driven by the cyclically moving drive, the eccentric having wire guide means and forming one support for said wire;
   the eccentric being replaceable from the machine with similar eccentrics having wire guide means located at different points of eccentricity to provide the selection of said angles of inclination $\alpha$.

10. Machine according to claim 1, wherein (FIG. 15) the means controlling the wire to carry out its cyclical motion comprises
    a pair of transversely arranged electrical-mechanical motion transducers (40, 50) connected to at least one of said support means;
    and oscillator means (60) electrically controlling the transducers (40, 50) to control, depending on phasing and amplitude of the signals applied from said oscillator to said transducers, the motion of said wire support means, said wire support means carrying out cyclical movement comprising Lissajou figures, the excursion of said figures controlling said angle $\alpha$.

11. Machine according to claim 10, wherein the transducer is a piezoelectric transducer.

12. Machine according to claim 16, wherein the transducer is a magnetostrictive transducer.

13. Machine according to claim 1, wherein (FIG. 3) both support means (2, 3) carry out the cyclical motion in relatively opposite directions, the work piece being located between said support means and having a plane intersecting the nodal point of the motion of the wire to effect a cut in the work piece which has a pair of inclined surfaces angled oppositely with respect to each other from said plane.

14. Machine according to claim 1, wherein said cycling means controls, and said rod linkage means transmits motion to, only one of said support means (2,3).

15. An electro-erosive cutting machine comprising:

a wire electrode (1), a pair of support means (2,3) stretching the wire therebetween, the wire being guided by said support means along a cutting path in a feed motion and means for continually renewing the electrode wire;
    cycling means controlling at least one of said support means for causing the wire to carry out a cyclical motion additional to and superimposed upon the feed motion along the cutting path, said superimposed cyclical motion effected in a plane substantially transverse to the axis of the wire, the excursion of the wire due to the superimposed cyclical motion including an angle of inclination $\alpha$ with respect to a direction perpendicular to said plane to provide an inclined cut to a work piece, said cycling means comprising (FIGS. 5,6) a slide joint (15), a single crank drive (14) and levers (16,17) interconnecting the crank drive and at least one of the wire supports (2,3) and being slidable in the slide joint, the length of the crank from its crankshaft (13) determining said angle $\alpha$.

16. Machine according to claim 15, wherein the length of the crank arm is continuously variable during motion of the crank arm to effect elliptical cyclical motion.

17. Machine according to claim 15, wherein (FIG. 5) the slide joint (15) is located intermediate the length of the levers and the crank arm is located at the end of the lever remote from the wire support.

18. Machine according to claim 15, wherein (FIG. 6) the slide joint 15 is located at one end of the lever remote from the wire support;
    and the crank arm is located intermediate the length of the lever.

19. Machine according to claim 15, comprising a motor (23') and drive means (25') connected to the motor;
    and the crank drive comprises an eccentric (27') and an eccentric pin connected to said lever.

20. Machine according to claim 19, wherein the eccentricity of the eccentric pin is adjustable.

* * * * *